United States Patent [19]

Covey

[11] Patent Number: 4,654,747
[45] Date of Patent: Mar. 31, 1987

[54] DIELECTRIC ISOLATION OF METALLIC CONDUITS

[75] Inventor: James H. Covey, Snohomish, Wash.

[73] Assignee: The Boeing Company, Seattle, Wash.

[21] Appl. No.: 781,908

[22] Filed: Sep. 30, 1985

[51] Int. Cl.⁴ .............................................. H05F 3/00
[52] U.S. Cl. ..................................... 361/215; 361/218
[58] Field of Search ....................... 285/47, 50, 53, 55, 285/363, 369; 339/14, 15, 16 R; 361/215, 218

[56] References Cited

U.S. PATENT DOCUMENTS

| 34,455 | 2/1862 | Wilcox | 285/48 |
|---|---|---|---|
| 255,043 | 3/1882 | Smith | 285/47 |
| 426,121 | 4/1890 | Gennert | 285/50 |
| 454,717 | 6/1891 | Decker | 285/47 |
| 467,085 | 1/1892 | Decker | 285/47 |
| 481,912 | 8/1892 | Noll | 285/53 |
| 514,822 | 2/1894 | Gennert | 285/50 |
| 570,166 | 10/1896 | Greenfield | 285/53 |
| 572,124 | 12/1896 | McElroy | 285/48 |
| 595,437 | 12/1897 | Greenfield | 285/53 |
| 1,035,212 | 8/1912 | McCarthy | 285/53 |
| 1,592,175 | 7/1926 | Boyd | 285/48 |
| 1,859,311 | 5/1932 | McEvoy, Jr. | 285/53 |
| 2,569,333 | 9/1951 | Peterson | 295/16 |
| 2,940,787 | 6/1960 | Goodner | 287/125 |
| 3,686,747 | 8/1972 | Bagnulo | 29/508 |

Primary Examiner—L. T. Hix
Assistant Examiner—Douglas S. Lee
Attorney, Agent, or Firm—Bruce A. Kaser

[57] ABSTRACT

A first and a second conduit section (10, 12) each have end portions (11, 13) which are covered by a dielectric insulating material (14, 22). The dielectric material (14, 22) covers an outer side surface (16, 24), an end surface (18, 26), and an inner side surface (20, 28) of each end portion (11, 13). The conduit sections are connected together at their ends to form a continuous conduit. Each section is grounded, which in combination with the dielectric material, prevents an electric spark from arcing between their ends.

5 Claims, 3 Drawing Figures

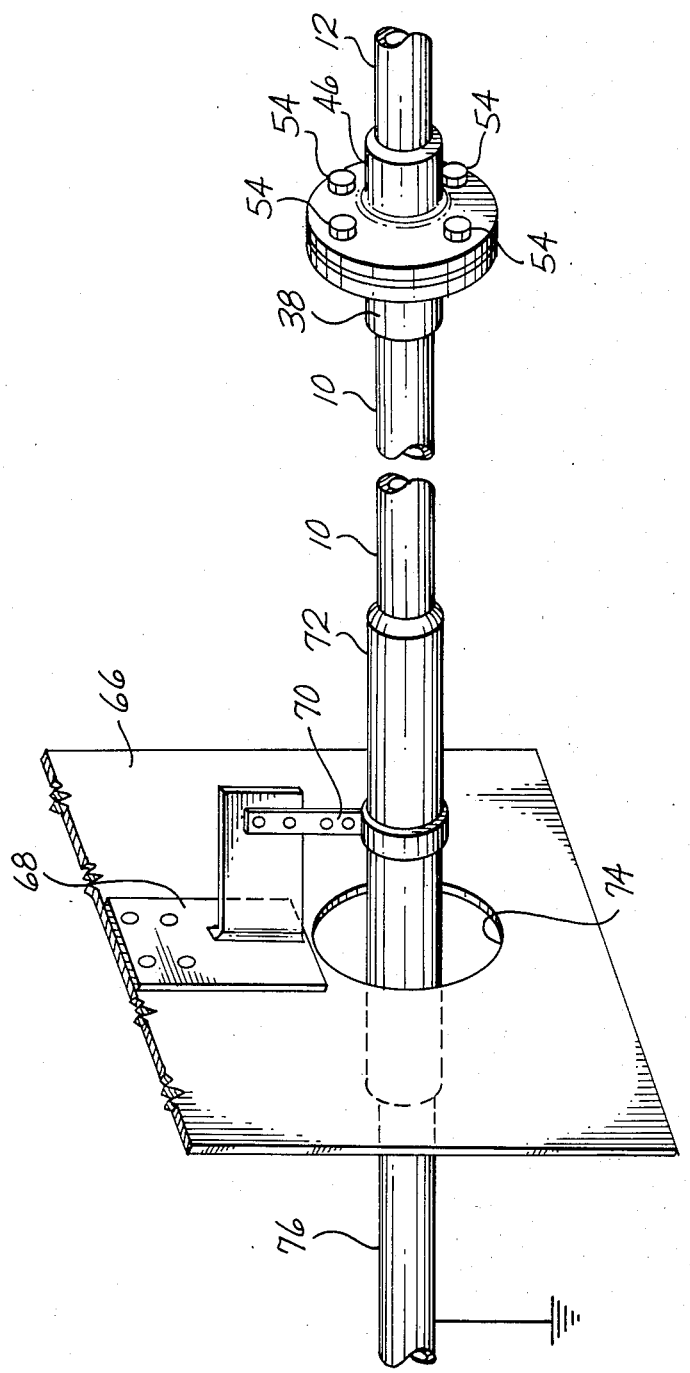

DIELECTRIC ISOLATION OF METALLIC CONDUITS

The U.S. government has a property interest in the invention disclosed herein.

TECHNICAL FIELD

This invention relates to conduits for hydraulic fluids or fuel, or the like. More particularly, it relates to an apparatus for eliminating electrical arcing between conduit sections.

BACKGROUND ART

Hydraulic fluid and fuel conduits in aircraft are often constructed of a series of metal conduit sections connected together so that they form a continuous conduit. The conduit sections are typically connected together by means of standard sleeve couplings, or in some cases, the sections have flanged ends which are bolted together. A known problem with having these types of connections is that electrical voltages tend to develop across the joints between the ends of connecting sections. This can result in electrical arcing across the joints. If such arcing occurs in a conduit containing a flammable fluid it could ignite the fluid. Therefore, the principal object of the present invention is to provide protection against electrical arcing between conduit sections in hydraulic fluid or fuel conduit.

Prior art patents which may be relevant to the present invention are as follows:

| U.S. Pat. No. | 34,455 | Wilcox |
| --- | --- | --- |
| U.S. Pat. No. | 255,043 | Smith |
| U.S. Pat. No. | 426,121 | Gennert |
| U.S. Pat. No. | 454,717 | Decker |
| U.S. Pat. No. | 467,085 | Decker |
| U.S. Pat. No. | 481,912 | Noll |
| U.S. Pat. No. | 514,822 | Gennert |
| U.S. Pat. No. | 570,166 | Greenfield |
| U.S. Pat. No. | 572,124 | McElroy |
| U.S. Pat. No. | 595,437 | Greenfield |
| U.S. Pat. No. | 1,035,212 | McCarthy |
| U.S. Pat. No. | 1,592,175 | Boyd |
| U.S. Pat. No. | 1,859,311 | McEvoy |
| U.S. Pat. No. | 2,569,333 | Peterson |
| U.S. Pat. No. | 2,940,787 | Goodner |
| U.S. Pat. No. | 3,686,747 | Bagnulo |

DISCLOSURE OF THE INVENTION

In accordance with the present invention, and specifically adapted for use in an aircraft, a system is provided for electrically isolating sections of metal conduits connected together in series. The serial connection of the conduits permits them to form a single continuous fuel line or the like. The system includes a first electrically conductive tubular conduit section having an end portion and also having another portion. The end portion of the first conduit is connected to an end portion of a second electrically conductive tubular conduit section. The other portion of the first conduit is grounded.

A means is provided for supporting the first conduit from a supporting member located somewhere aboard the aircraft. Said supporting means is connected to the first conduit between its end portion and the grounded portion of the same. The support means is electrically insulated from the first conduit. Such insulation may, for example, be in the form of an insulated shrink tubing placed over the conduit.

Each of the end portions of the first and second conduits are covered by a dielectric material. Each end portion has an outer side surface, an end surface, and an inner side surface which is covered with dielectric material. The dielectric material electrically isolates each end portion from the other.

In one embodiment of the invention, a dielectric annular ring is positioned in abutting relationship between the end portions of the conduit sections. The dielectric material covering the end of the first conduit, the dielectric material covering the end of the second conduit, and the dielectric annular ring have thicknesses sufficient to stand off an electric voltage between the two conduit sections so that an electrical spark cannot arc between their end portions.

In another embodiment of the invention, the end portions of the conduit sections may be connected together so that the end surfaces of each respective end portion abuts against the other without having a dielectric ring positioned between them. The end surfaces would still be covered with dielectric material. However, absence of the dielectric ring requires the dielectric material on the end surfaces to have increased thicknesses sufficient to stand off a voltage potential between the conduit members, and to therefore prevent electrical arcing between them.

The end portions of the conduit sections may be connected together by a sleeve coupling, or alternatively, each end portion may have a radially projecting flange portion connected to a like flange portion of the other end portion.

The dielectric material is preferably in the form of a polyimide material. Suitable polyimides for use in the invention are Kapton (trademark) and Pyralin (trademark).

BRIEF DESCRIPTION OF THE DRAWINGS

In the drawings, like reference numerals are used to designate like parts throughout the drawings, and:

FIG. 3 is a pictorial view of the invention and shows a section of conduit mounted to a supporting member in an aircraft, and being electrically isolated from both adjacent structure in the aircraft and another conduit section.

BEST MODE FOR CARRYING OUT THE INVENTION

Figure 1:
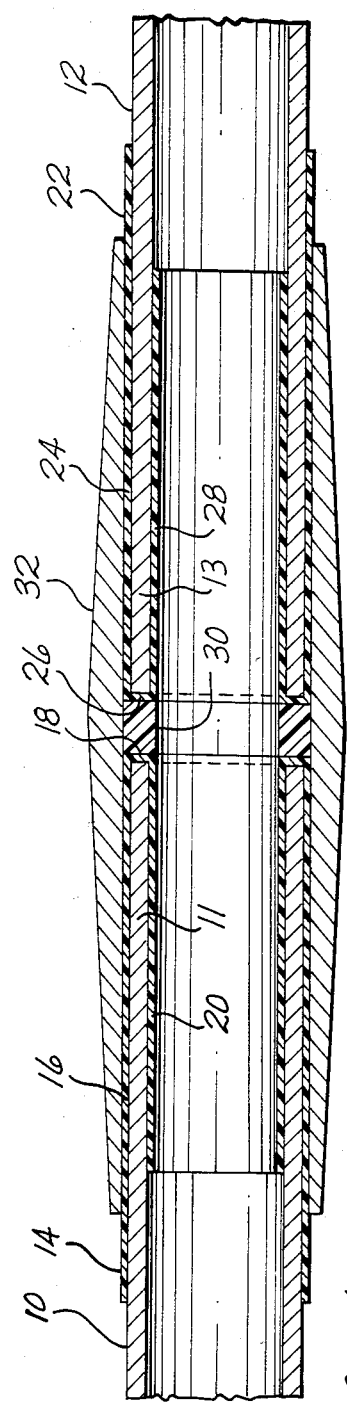
FIG. 1 is a fragmentary sectional view showing two conduit members connected together at their ends by a sleeve coupling.

Referring now to the drawings and specifically to FIG. 1, a first electrically conductive tubular conduit section 10 is shown connected to a second electrically conductive tubular conduit section 12. The end portion 11 of conduit section 10 is covered by a continuous sheet or film of dielectric material 14. The dielectric material 14 is attached to an outer side surface 16, an end surface 18, and an inner side surface 20 of the conduit section 10. In similar fashion, the end portion 13 of conduit section 12 is covered by a continuous sheet or film of dielectric material 22 which is attached to an outer side surface 24, an end surface 26, and an inner side surface 28 thereof.

Positioned between the end surfaces 18, 26 is a dielectric annular ring 30. The ring 30 is centrally located in a sleeve coupling 32 which connects the ends of the conduit sections 10, 12 together. By way of example, sleeve coupling 32 may be swaged onto the end portions 11, 13 of the conduit sections 10, 12.

Figure 2:
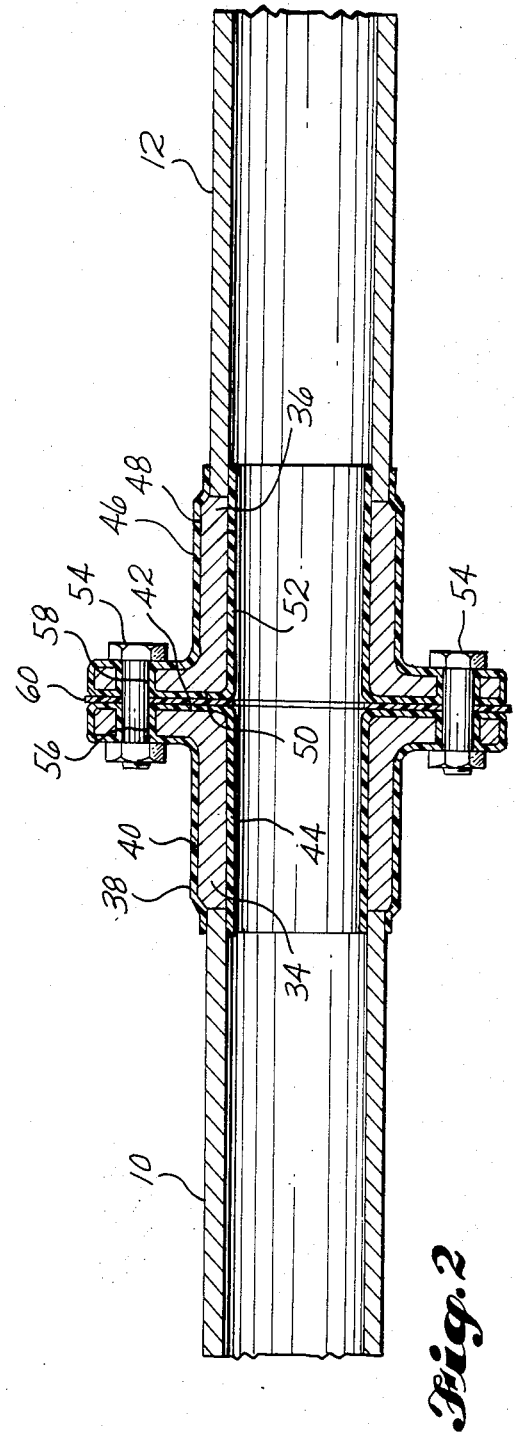
FIG. 2 is a fragmentary sectional view similar to FIG. 1 but shows two conduit members having flanged end portions bolted together.

A similar embodiment of the invention is shown in FIG. 2. In this embodiment, tubular conduit sections 10, 12 have end portions which are in the form of radially projecting flange portions 34, 36. A continuous sheet or film of dielectric material 38 is attached to the flange portion 34 of conduit section 10 and covers an outer side surface 40, an end surface 42, and an inner side surface 44 thereof. Similarly, the flange portion 36 of conduit section 12 is covered by a continuous sheet or film of dielectric material 46 attached to an outer side surface 48, an end surface 50, and an inner side surface 52 thereof.

Flange portion 34 is connected to flange portion 36 by means of threaded nuts and bolts 54 which extend through bores 56 and 58 in flange portions 34 and 36, respectively. As can be seen in FIG. 2, the passageways defined by bores 54 and 56 are also covered by dielectric material 38, 48 so as to isolate the bolts 54 from the flanges 34, 36. Positioned between the end surfaces 42, 50 of the flanges 34, 36 is an annular dielectric ring 60.

In both of the embodiments shown in FIGS. 1 and 2, it is preferred to have a dielectric annular ring positioned between the end surfaces of the conduit sections 10, 12. The dielectric material covering the end of conduit 10, the dielectric material covering the end of conduit 12 and the dielectric annular ring must have thicknesses that cooperate to electrically isolate the end portions from each other. This prevents electrical voltages on the conduit sections from causing an electric spark to arc from one conduit section to the other.

For the embodiment shown in FIG. 1, the dielectric material 14 and 22 on the conduit end portions 11, 13 must also be thick enough so that an electric spark cannot arc between the end portions of the conduit sections and the sleeve coupling 32. In addition, the dielectric material 14, 22 must extend along the outer side surfaces 16, 24 of the conduit sections 10, 12 a sufficient distance from sleeve coupling 32 so that no arcing can occur between the sleeve coupling and the conduits.

It may be possible to electrically isolate conduit 10 from conduit 12 without having a dielectric ring positioned between their ends. However, this would necessitate an increase in the thickness of the dielectric material used on each end of the conduits.

By way of example only, a preferred material for use in isolating the conduit sections 10, 12 is a polyimide material. One suitable polyimide material is Kapton (trademark) manufactured by the Dupont Company.

Referring now to FIG. 3, therein is shown the conduit section 10 connected to a supporting member 66 which is attached somewhere to an aircraft (not shown in the drawings). Connected to the supporting member 66 is a means for supporting the conduit 10, which is in the form of a bracket 68 having a downwardly extending pipe clamp 70. The conduit 10 has a section of shrink tubing 72 which electrically insulates the conduit from the pipe clamp 70 and the supporting member 66.

The conduit 10 shown in FIG. 3 has flanged ends like the flanged ends shown in FIG. 2.

The conduit 10 extends through an aperture 74 in the supporting member 66 and another portion 76 of the conduit is electrically grounded by any suitable means. Electrically grounding the conduit bleeds off any charge build-up on the conduit. The combination of grounding the another portion 76 and using the dielectric material to cover the end portion 11 of the conduit prevents electrical arcing between the conduit members 10, 12 and between the conduit 10 and surrounding aircraft structure.

The installation which is illustrated and described herein is provided for the purpose of better explaining the invention. The embodiments presented herein are not to be used for the purpose of directly defining or limiting the invention. Rather, the scope of the invention is to be determined only by the appended claims interpreted in accordance with established doctrines of patent claim interpretation.

What is claimed is:

1. For use in a fuel or hydraulic line onboard an aircraft, a system for electrically isolating sections of metal conduits connected together in series which form such a line, said system comprising:

a first electrically conductive tubular conduit section having an end portion connected to an end portion of a second electrically conductive tubular conduit section, and having another portion;

means for grounding said another portion;

means for supporting said first conduit section in said aircraft;

means for electrically insulating said first conduit section from said supporting means, wherein said end portions of said first and second conduit sections each have a layer of dielectric polyimide material covering an outer side surface, and end surface, and an inner side surface thereof, to electrically isolate each end portion from the other.

2. A system in accordance with claim 1, including an annular ring of dielectric material positioned between the end portions of said first and second conduit sections.

3. A system in accordance with claim 1, wherein said insulating means comprises a tubular member made of an insulating material, said tubular member surrounding said first conduit section and being positioned between said first conduit section and said supporting means in a manner so as to electrically isolate said first conduit section from said supporting means.

4. In an aircraft, a method of preventing electrical arcing between a plurality of electrically conductive tubular conduit sections which are connected together at their ends to form a continuous fuel or hydraulic line, or the like, comprising:

coating the ends of each section with a layer of dielectric polyimide material; and electrically grounding each section.

5. The method of claim 4, including:

providing a dielectric ring between the ends of the conduit sections.

* * * * *